United States Patent
Nakanishi et al.

(10) Patent No.: US 7,277,584 B2
(45) Date of Patent: Oct. 2, 2007

(54) FORM RECOGNITION SYSTEM, FORM RECOGNITION METHOD, PROGRAM AND STORAGE MEDIUM

(75) Inventors: Keiko Nakanishi, Tokyo (JP); Kenichi Kazumi, Kanagawa (JP); Kitahiro Kaneda, Kanagawa (JP); Hiroki Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 742 days.

(21) Appl. No.: 10/190,819

(22) Filed: Jul. 9, 2002

(65) Prior Publication Data
US 2003/0012440 A1    Jan. 16, 2003

(30) Foreign Application Priority Data
Jul. 11, 2001    (JP) .............................. 2001-210799

(51) Int. Cl.
    G06K 9/68    (2006.01)
    G06K 9/00    (2006.01)
    G06K 9/34    (2006.01)
(52) U.S. Cl. ...................... 382/218; 382/113; 382/165; 382/180
(58) Field of Classification Search ................ 382/218, 382/113, 180, 165
    See application file for complete search history.

(56) References Cited

U.S. PATENT DOCUMENTS

| | | | |
|---|---|---|---|
| 4,196,452 A * | 4/1980 | Warren et al. ............. | 358/3.22 |
| 4,584,703 A | 4/1986 | Hallberg ...................... | 382/50 |
| 4,672,678 A * | 6/1987 | Koezuka et al. ............ | 382/219 |
| 5,159,667 A * | 10/1992 | Borrey et al. ............... | 715/500 |
| 6,104,833 A * | 8/2000 | Naoi et al. ................... | 382/190 |
| 6,327,382 B1 * | 12/2001 | Kaneda et al. .............. | 382/164 |
| 6,449,396 B1 * | 9/2002 | Loce et al. .................. | 382/276 |
| 6,674,900 B1 * | 1/2004 | Ma et al. ..................... | 382/176 |
| 2002/0052892 A1 | 5/2002 | Kazuml ....................... | 707/505 |

FOREIGN PATENT DOCUMENTS

| | | |
|---|---|---|
| EP | 0 166 598 A2 | 6/1985 |
| EP | 0 461 793 A2 | 6/1991 |
| EP | 1 052 593 A2 | 11/2000 |

* cited by examiner

*Primary Examiner*—Bhavesh M Mehta
*Assistant Examiner*—Kathleen Yuan
(74) *Attorney, Agent, or Firm*—Fitzpatrick, Cella, Harper & Scinto

(57) ABSTRACT

A plurality of binary images are obtained from one form image by binarizing the form image by using a plurality of binarizing threshold values for improving a recognition rate of the search form irrespective of a state of the inputted form image, and format data are generated respectively from the plurality of binary images. If the inputted form image is a binary image, after the binary image has been converted into a multi-valued image by a vignetting filter, a plurality of binary images are obtained from one form image by executing the binarizing processing by use of the plurality of binarizing threshold values respectively, thereby generating the format data respectively from the plurality of binary images.

6 Claims, 5 Drawing Sheets

FORM RECOGNITION SYSTEM, FORM RECOGNITION METHOD, PROGRAM AND STORAGE MEDIUM

BACKGROUND OF THE INVENTION

1. Field of the Invention

The present invention relates to a system for and method of recognizing a form, a program and a storage medium.

2. Related Background Art

A form recognition system has hitherto identified a search form in a way that previously registers a storage means with format data of a form serving as a reference for a plurality of searches (this form being hereinafter referred to as a register form), then obtains a similarity of the format data of the register form to a search target form (which will hereinafter be called a search form) by comparing these two sets of format data with each other, and specifies the register form having the same format as that of the inputted search form.

A creation of the format data of the register form involves generating one item of binary image data by binarizing form image data of the register form read by a scanner with a predetermined threshold value, then extracting a feature quantity from the binary image data, and thus generating the format databased on this image feature quantity.

Further, in the case of creating the register form in monochrome on a computer, a target image is, as a matter of course, a binary image, a feature quantity if extracted from this binary image, and the format data of the register form are thus created.

SUMMARY OF THE INVENTION

Even if binarized with the same threshold value, however, there might be a case where the format data change with a change in the binary image data of the search form due to deterioration (color fading and yellowing in originals) of the search form or depending on a state of how the scanner reads. In this case, according to the prior arts, the format data of the register form are generated by extracting the feature quantity from one item of binary image data, and hence, if the binary image of the search form undergoes fluctuations, it might happen that the search form can not be identified, with the result that a recognition rate of the search form decreases.

Accordingly, it is a primary object of the present invention to provide a scheme capable of improving the recognition rate of the search form. To accomplish the above object, according to one aspect of the present invention, a form recognition system comprises input means inputting form image data, binary image obtaining means obtaining plural items of binary image data by binarizing the inputted form image data by use of a plurality of binarizing threshold values, form format data generating means generating form format data from each of the plural items of binary image data, and storage means storing the plural items of form format data generated.

To accomplish the above object, according to another aspect of the present invention, a form recognition method comprises a binary image obtaining step obtaining plural items of binary image data by binarizing inputted form image data by use of a plurality of binarizing threshold values, a form format data generating step generating form format data from each of the plural items of binary image data, and a storing step storing a memory with the plural items of form format data generated.

Other features and advantages of the present invention will be apparent from the following description in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Figure 1:
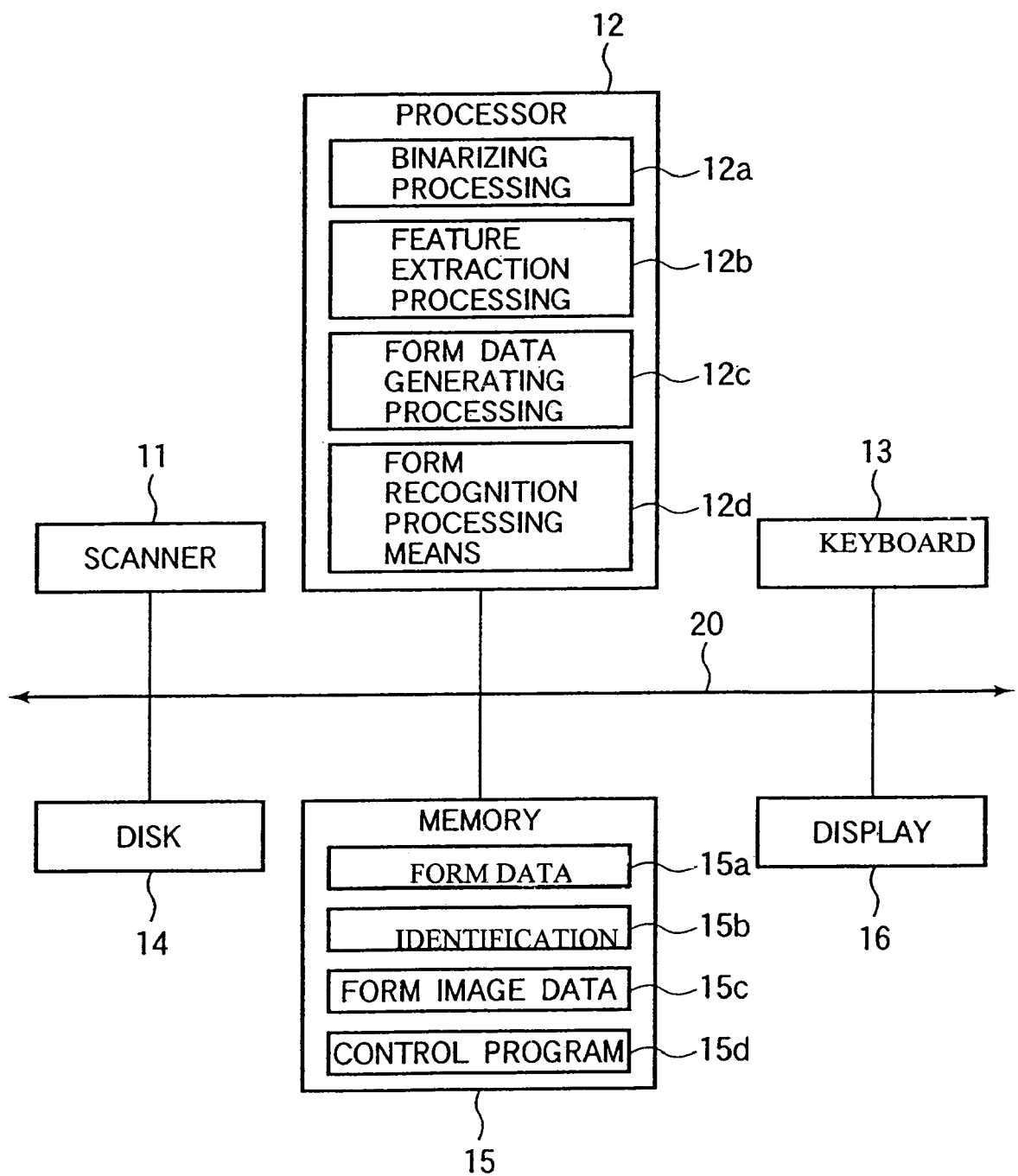
FIG. 1 is a block diagram showing a basic architecture of a form recognition system in embodiments of the present invention.

FIG. 1 is a block diagram showing a basic architecture of a form recognition system in embodiments.

An image reader 11 such as a scanner obtains from image data by executing a photoelectric conversion with respect to a form. Note the thus read form image data are stored in a memory 15. Further, the image data may also be obtained by use of a digital camera as a substitute for this scanner.

A processor 12 executes a control program 15*d* stored in the memory 15, thereby executing a binarizing processing 12*a* of binarizing the form image data, a feature quantity extraction processing 12*b* of extracting a feature quantity based on the binary data, a format data generating processing 12*c* of generating format data from the extracted feature quantity, and a form recognition processing 12*d* of recognizing the form in a way that compares format data of a register form with format data of a search form. To be specific, the control program is read and executed as indicated by flowcharts shown in FIGS. 2 through 5. Note that the control program be, it is assumed, stored in the memory in this embodiment, however, there may be adopted a scheme of properly executing the control program read from other device via a network.

A keyboard 13 is operated by a user to give indications such as registering and searching for the form. A disk 14 functions as a sub-storage device and is categorized as a hard disk, a floppy disk and so on. The memory 15 is used for storing the control program, various categories of data such as the form image data read by the scanner, and for caching the data when the processor 12 generates processing control information. Note that a scheme may be taken, wherein the control program and the various categories of data are stored on the disk 14 and read out to the memory 15 as the necessity arises.

A display 16 serving as an output means for outputting various items of information such as a result of recognition and so forth. These components are connected to each other via a bus 20.

Further, the form recognition system may include a network interface (not shown) for linking to other devices via the network.

The image data read by the scanner 11 are stored as form image data 15c in the memory 15. The form image data are converted into binary images by the binarizing processing 12a, and these binary images are transferred to the image feature quantity extraction processing 12b, wherein the binary image data undergo a region segmentation into blocks such as a table, a text, a picture etc and are categorized based on attributes by use of a histogram method, a contour line tracing method and so on. The format data are generated from the thus categorized information by the format data generating processing 12c, and saved on the memory or the disk. In the case of registering the register form in the memory, pieces of format data 15a are stored mapping to identification codes 15b.

First Embodiment

Figure 2:
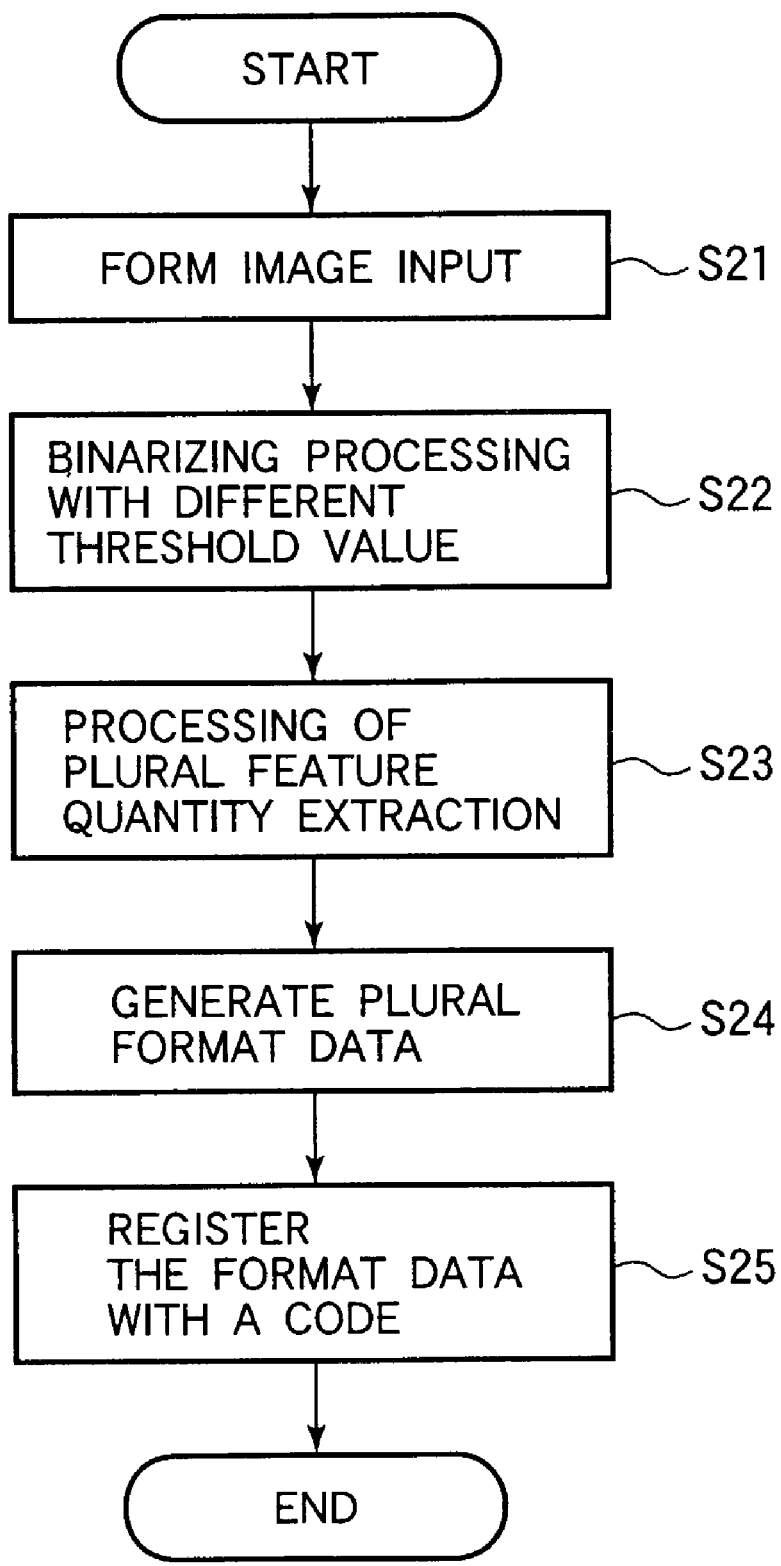
FIG. 2 is a flowchart showing steps of a form registering processing in the first embodiment.

FIG. 2 is the flowchart showing steps of the form register processing when registering the register form in the memory in the first embodiment.

To start with, in step S21, the scanner 11 reads the register form and transfers its multi-valued form image data to the memory 15. Note that the inputted register form described above may be, though structured to be read by the scanner, sufficient if convertible into the multi-valued register form image data, may also be what is inputted from other device via, e.g., the network, and be what is plotted on the form recognition system by the user.

In step S22, the form image data are binarized into binary image data. Herein, plural pieces of binary image data are obtained by executing the binarizing processing by use of a plurality of threshold values. The threshold values used for the binarizing processing may involve the use of a plurality of arbitrary values or equal-interval values, or multiple threshold values may also be taken within a range where the binarized result is easy to largely vary.

Further, the binarized threshold values may also be uniformly applied to the entire form image, or the form image is segmented into a plurality of sub regions (which are, for instance, attribute-based sub regions such as a table block, a text block and so on), and the threshold value to be applied may also be changed per sub region.

In step S23, the region segmentation and the attribute categorization are performed with respect to each of the thus obtained plural pieces of binary image data, thereby extracting feature quantity data (containing positions and attributes of the regions such as the table bloc, the text block etc, and a table structure). The region segmentation and the attribute categorization are effected with respect to each of the plural pieces of binary image data, and it therefore follows that the plural items of feature quantity data are extracted.

In step S24, necessary items of information are extracted from the thus extracted plural items of feature quantity data, thereby generating format data. Namely, it follows that the plural items of format data are generated from one piece of image data.

Then, in step S25, the plural items of format data are registered mapping to one single identification code. Note that this identification code is a code representing a type of the register form.

Figure 3:
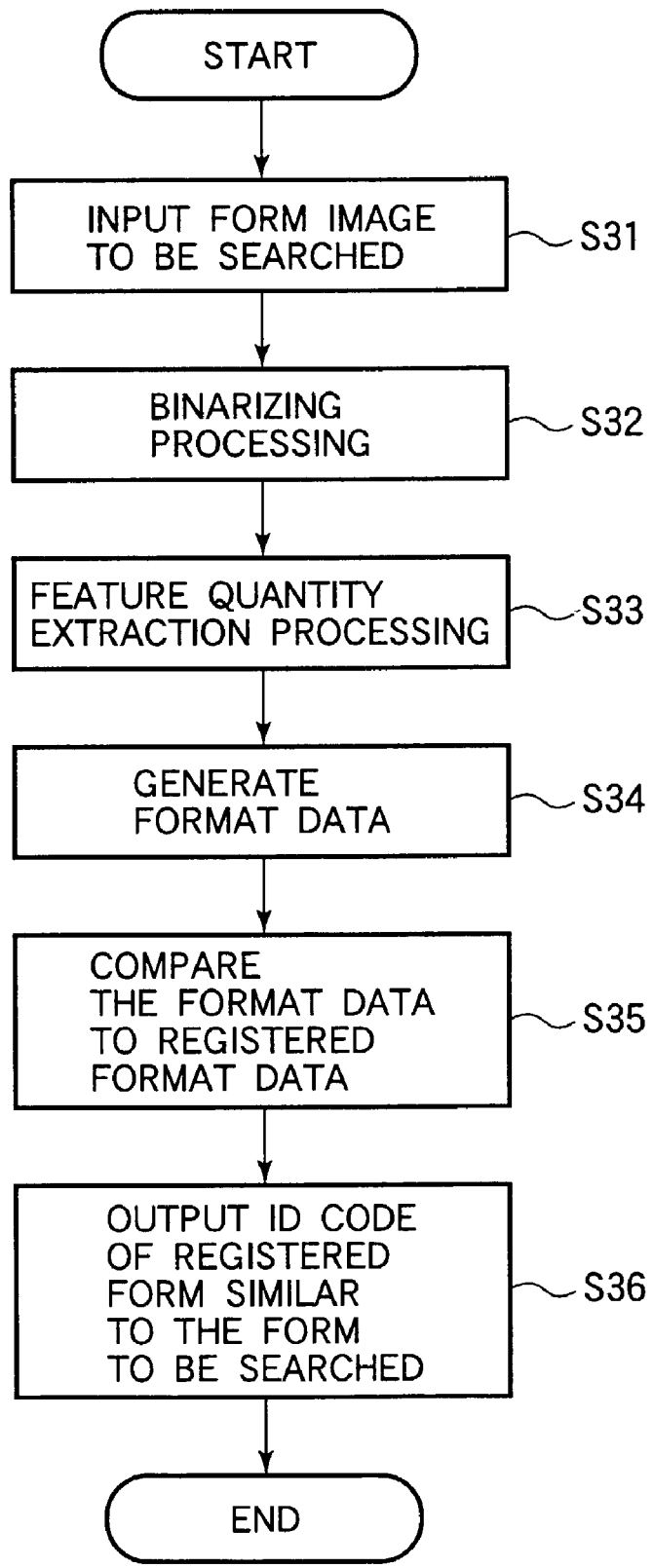
FIG. 3 is a flowchart showing steps of a form searching processing in the first embodiment.

FIG. 3 is the flowchart showing steps of the search processing for identifying the search form in the first embodiment.

To begin with, in step S31, the scanner 11 reads the search form defined as a search target, and transfers the image data of the search form to the memory 15.

In step S32, the image data are binarized by use of the predetermined threshold values, thereby obtaining the binary image.

Next, in step S33, the thus obtained binary image undergoes the region segmentation and the attribute categorization, thereby extracting therefrom the feature quantity data (containing the positions and the attributes of the regions such as the table bloc, the text block etc, and the table structure).

Next, in step S34, the necessary items of information are extracted from the extracted feature quantity data, and the format data are thereby generated.

Then, in step s35, the generated format data of the search form are compared with the registered format data of the register form, thereby calculating a similarity.

Subsequently, in step S36, an identification code of the register form exhibiting a high similarity to the search form, is outputted.

The plural items of format data are registered mapping to one single identification code representing a form type, and hence, there being an increased probability that the format data of the search form is similar to any item of format data of the register form, a precision of the recognition rises.

Second Embodiment

Figure 4:
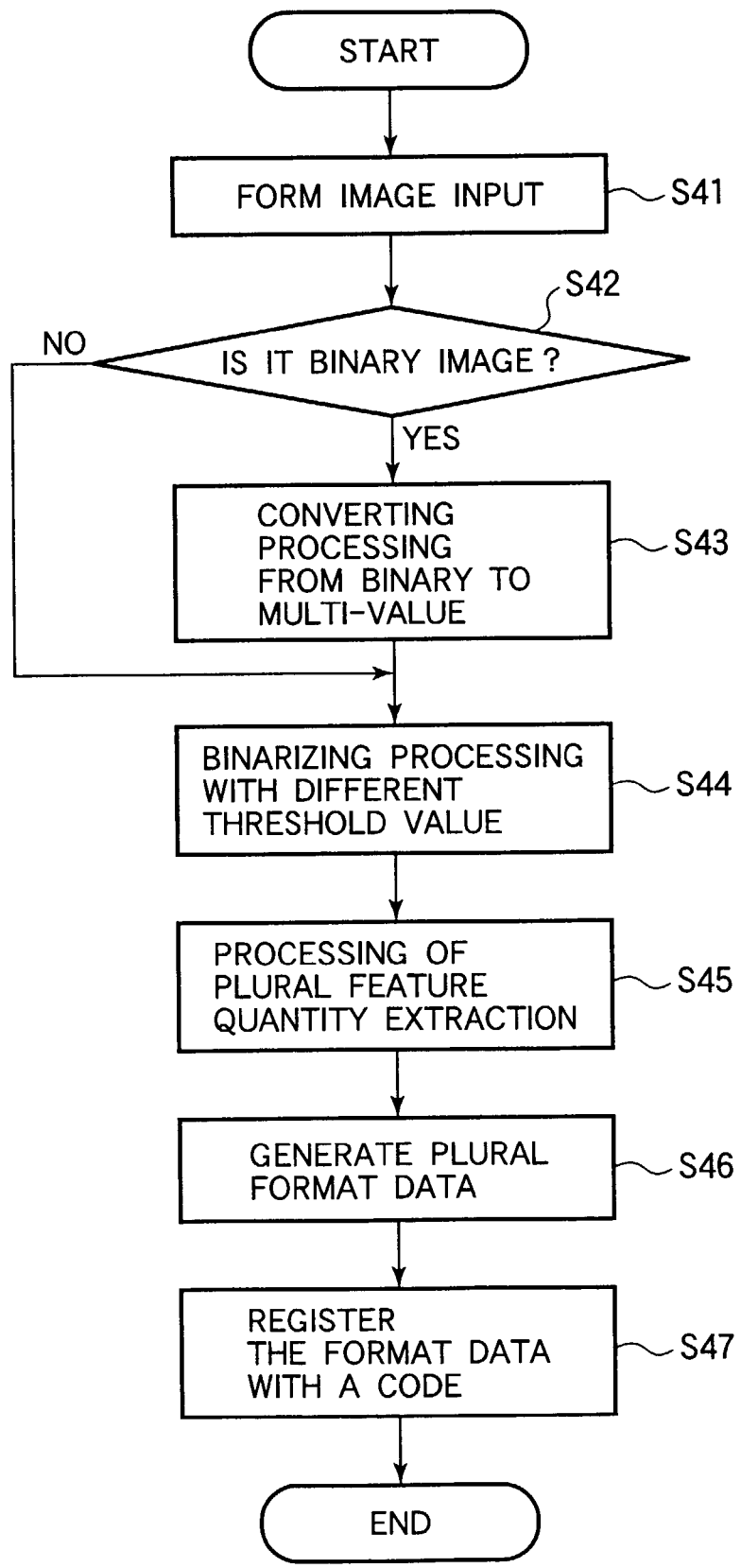
FIG. 4 is a flowchart showing steps of the form registering processing in the second embodiment.

FIG. 4 is the flowchart showing steps of the form register processing when registering the register form in the memory in the second embodiment.

According to the first embodiment, the register form is inputted as the multi-valued image, however, the second embodiment aims at a scheme corresponding to a case where the register form is inputted as a binary image.

At first, in step S41, the image data of the register form are inputted and transferred to the memory 15. The image data of this register form may be what is inputted from whichever device on condition that the data be defined as image data of the register form. The image data may also be what is inputted from the scanner 11 or from other device via the network or may be what is plotted on the form recognition system by the user.

Then, it is judged in step S42 whether the inputted image is defined as a binary image. If judged not to be the binary image, the processing diverts to step S44. Whereas if judged to be the binary image, the processing advances straight to step S43.

In step S43, the binary image is converted into a multi-valued image. The conversion of the binary image into the multi-valued image involves using an arbitrary vignetting filter such as a smoothing filter etc, whereby the binary image undergoes a blurring processing and is thus converted into a multi-valued image. For example, the use of the blurring filter can result in generating a multi-valued image according to a state of density of black pixels on the original binary image (the multi-valued image being such that for instance, a bold line on the original binary image becomes thick, while a fine line on the original binary image becomes thin).

In step S44, the binarizing processing is executed on the multi-valued image data, thereby obtaining the binary image. Herein, as in step S22 according to the first embodiment, the binarizing processing is implemented by use of the plurality of threshold values, whereby the plural pieces of binary image data are obtained.

In step S45, the region segmentation and the attribute categorization are effected with respect to each of the thus obtained plural pieces of binary image data, thereby extracting feature quantity data (containing positions and attributes of the regions such as the table bloc, the text block etc, and a table structure). The region segmentation and the attribute categorization are effected with respect to each of the plural pieces of binary image data, and it therefore follows that the plural items of feature quantity data are extracted.

In step S46, necessary items of information are extracted from the thus extracted plural items of feature quantity data, thereby generating format data. Namely, it follows that the plural items of format data are generated from one piece of image data irrespective of whether the image data inputted in step S41 are multi-valued or binary.

Then, in step S47, the plural items of format data are registered with corresponding to one single identification code. Note that this identification code is a code representing a type of the register form.

Then, when identifying the search form, the same processing as in the first embodiment shown in FIG. 3 can be applied.

As discussed above, even when the inputted image data of the register form are the binary image data, the plural items of format data can be obtained, and hence there increases the precision of the recognition when identifying the search form.

Third Embodiment

Figure 5:
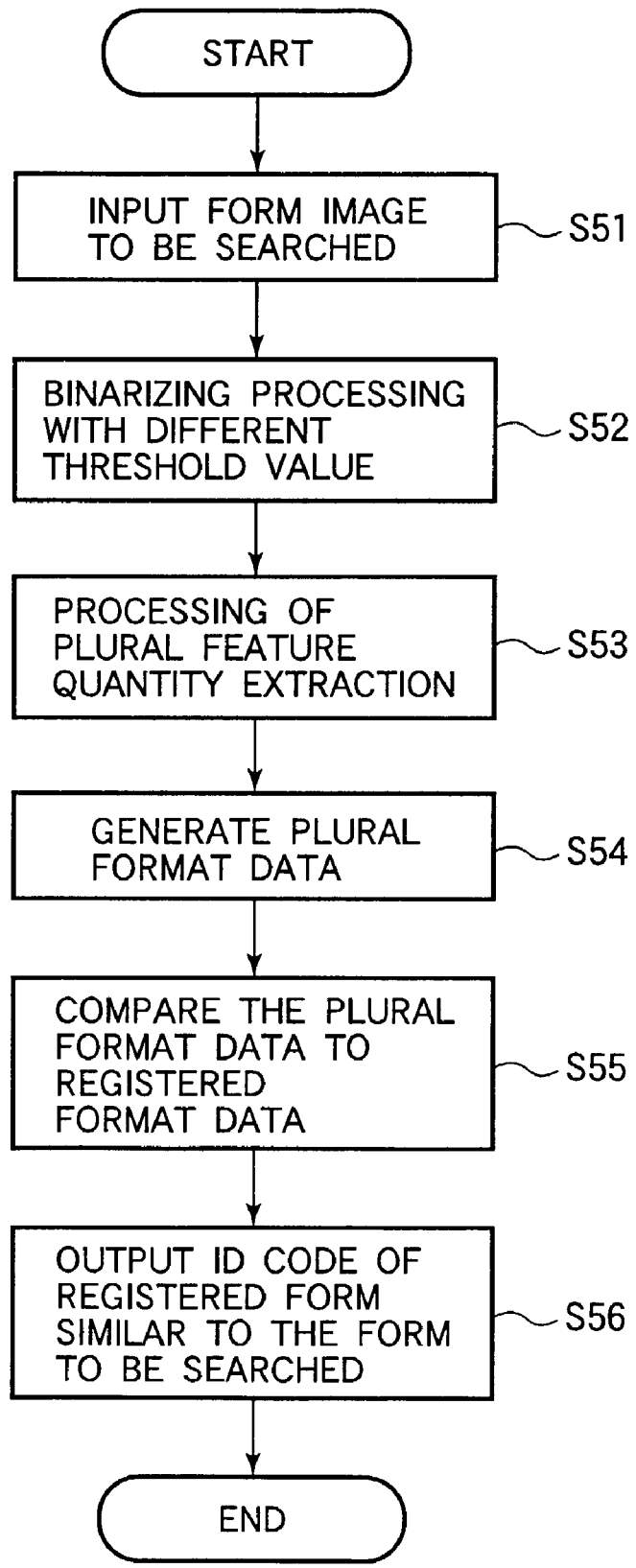
FIG. 5 is a flowchart showing steps of the form searching processing in the second embodiment.

FIG. 5 is the flowchart showing steps of the search processing for identifying the search form in the third embodiment.

At the first onset, in step S51, the scanner 11 reads the form to be searched for, and transfers the data thereof as multi-valued image data of the search form to the memory 15.

In step S52, the form image data are binarized into binary image data. Herein, plural pieces of binary image data are obtained by executing the binarizing processing by use of a plurality of threshold values. The threshold values used for the binarizing processing may involve using a plurality of arbitrary values or equal-interval values, or multiple threshold values may also be taken within a range where the binarized result is easy to largely vary.

In step S53, the region segmentation and the attribute categorization are performed with respect to each of the thus obtained plural pieces of binary image data, thereby extracting feature quantity data (containing positions and attributes of the regions such as the table bloc, the text block etc, and a table structure). The region segmentation and the attribute categorization are effected with respect to each of the plural pieces of binary image data, and it therefore follows that the plural items of feature quantity data are extracted.

In step S54, necessary items of information are extracted from the thus extracted plural items of feature quantity data, thereby generating format data. Namely, it follows that the plural items of format data are generated from one piece of image data.

In step S55, the generated plural items of format data are compared with the format data of the register form, thereby calculating a similarity.

Subsequently, in step S56, an identification code of the register form exhibiting a high similarity to the search form, is outputted.

The plural items of format data of the search form are generated and compared, and therefore any one item of format data among the plural items of format data exhibits the high similarity to the register form, whereby the precision of the recognition increases.

Note that the format data of the register form may be structured such that the plural items of format data generated in the steps exemplified in the first and second embodiments are registered mapping to one identification code, or one item of format data generated from the binarized image data of the register form by use of one predetermined threshold value, is registered with corresponding to one identification code. It is to be noted that the first and second embodiments show a larger format data count of the format data registered in the steps of the form register processing exemplified therein, and hence there is a higher precision of the recognition.

Moreover, in step S51, if the scanner 11 is a scanner for reading the search form as a binary image, the image data of the search form which are to be inputted, represent the binary image, so that the inputted binary image may be converted into the multi-valued image as by step S43 in the second embodiment. The conversion of the binary image into the multi-valued image may involve using an arbitrary vignetting filter such as the smoothing filter (Gaussian filter etc), whereby the binary image undergoes the vignetting processing and is thus converted into the multi-valued image. Thus, even when the input image of the search form is the binary image, the plural items of format data are generated, with the result that the precision of the recognition can be raised.

As discussed above, according to the first, second and third embodiments, the form image is converted into the plurality of binary images by using the plurality of threshold values, and the format data is generated from each of the plurality of binary images, whereby the recognition rate can be improved.

Further, even when the inputted form image is the binary image, the plural items of format data can be generated, and hence the recognition rate can be improved.

What is claimed is:

1. A form recognition system comprising:

input means for inputting form image data;

judging means for judging whether the form image data inputted by said input means is binary image data or multi-valued image data;

converting means for converting the form image data inputted by said input means into multi-valued form image data, if the inputted form image data is judged as binary image data by said judging means;

binary image obtaining means for binarizing the multi-valued form image data converted by said converting means or the inputted form image data judged as multi-valued image data by said judging means in order to obtain a plurality of binary images of a register form by using a plurality of binarizing threshold values, wherein the register form serves as a reference of a form identification code:

extracting means for extracting feature data from each binary image obtained by said binary image obtaining means;

form data generating means for generating plural form data based on the feature data extracted from the plurality of binary images of the register form, each form data including the feature data extracted from each binary image;

storage means for storing the plural form data generated by said form data generating means, the stored plural form data being mapped to the same identification code of the register form;

second binary image obtaining means for obtaining a binary image of a search form by binarizing form image data of the search form, the search form serving as a target of the form identification code;

second form data generating means for generating form data of the search form based on the binary image of the search form obtained by said second binary image obtaining means; and form identifying means for identifying the identification code of the register form similar to the search form by comparing the form data of the search form with each of the stored plural form data of the register form.

2. A form recognition system according to claim 1, wherein said second binary image obtaining means obtains second plural binary images of the search form by binarizing the form image of a search form as a search target using a plurality of binarizing threshold values, wherein said second form data generating means generates plural form data of the search form based on the second plural binary images of the search form obtained by said second binary image obtaining means, and wherein said form identifying means identifies the identification code of the register form similar to the search form by comparing each of the plural form data of the search form with each of the plural form data.

3. A form recognition method for processing inputted form image data, comprising:

a judging step for judging whether the inputted form image data is binary image data or multi-valued image data;

a converting step for converting the inputted form image data into multi-valued form image data, if the inputted form image data is judged as binary image data in said judging step;

a binary image obtaining step of obtaining a plurality of binary images of a register form by binarizing multi-valued form image data converted in said converting step or the inputted form image data judged as multi-valued image data in said judging step in order of the register form using a plurality of binarizing threshold values of the register form which serve as a reference of a form identification code;

an extracting step of extracting feature data from each binary image obtained in said binary image obtaining step;

a form data generating step of generating plural items form data based on the feature data extracted from the plurality of binary images of the register form, each form data including the feature data extracted from each binary image;

a storing step of storing in a memory the plural form data generated in said form data generating step, the stored plural form data being mapped to the same identification code of the register form;

a second binary image obtaining step of obtaining a binary image of a search form by binarizing form image data of the search form, the search form serving as a target of the form identification code:

a second form data generating step of generating form data of the search form based on the binary image of the search form obtained in said second binary image obtaining step; and a form identifying step of identifying the identification code of the register form similar to the search form by comparing the form data of the search form with each of the stored plural form data of the register form.

4. A form recognition method according to claim 3, wherein said second binary image obtaining step includes obtaining second plural binary image data images of the search form by binarizing the form image of a search form as a search target using a plurality of binarizing threshold values, and wherein the method further comprises:

a second form data generating step of generating plural form data of the search form based on the second plural binary images of the search form obtained in said second binary image obtaining step, wherein in said form identifying step, the identification code of the register form similar to the search form is identified by comparing each of the plural form data of the search form with each of the plural form data of the register form.

5. A computer-implemented method for recognizing a form by processing inputted form image data, comprising:

a judging step for judging whether the inputted form image data is binary image data or multi-valued image data;

a converting step for converting the inputted form image data into multi-valued form image data, if the inputted form image data is judged as binary image data in said judging step;

a binary image obtaining step of obtaining a plurality of binary images of a register form by binarizing multi-valued form image data converted in said converting step or the inputted form image data judged as multi-valued image data in said judging step in order of the register form using a plurality of binarizing threshold values the register form serving as a reference of a form identification code:

an extracting step of extracting feature data from each binary image obtained in said binary image obtaining step;

a form data generating step of generating plural form data based on the feature data extracted from the plurality of binary images of the register form, each form data including the feature data extracted from each binary image;

a storing step of storing in a memory the plural form data generated in said form data generating step, the stored plural form data being mapped to the same identification code of the register form;

a second binary image obtaining step of obtaining a binary image of a search form by binarizing form image data of the search form, the search form serving as a target of the form identification:

a second form data generating step of generating form data of the search form based on the binary image of the search form obtained in said second binary image obtaining step; and a form identifying step of identifying the identification code of the register form similar to the search form by comparing the form data of the search form with each of the stored plural form data of the register form.

6. A computer storage medium storing computer executable program codes, comprising:

a judging step for judging whether inputted form image data is binary image data or multi-valued image data;

a converting step for converting the inputted form image data into multi-valued form image data, if the inputted form image data is judged as binary image data in said judging step;

a binary image obtaining step of obtaining a plurality of binary images of a register form by binarizing multi-valued form image data converted in said converting step or the inputted form image data judged as multi-valued image data in said judging step in order of the register form using a plurality of binarizing threshold values the register form serving as a reference of a form identification;

an extracting step of extracting feature data from each binary image obtained in said binary image obtaining step;

a form data generating step of generating plural form data based on the feature data extracted from the plurality of binary images of the register form, each form data including the feature data extracted from each binary image;

a storing step of storing in a memory the plural form data generated in said form data generating step, the stored plural form data being mapped to the same identification code of the register form;

a second binary image obtaining step of obtaining a binary image of a search form by binarizing form image data of the search form, the search form serving as a target of the form identification;

a second form data generating step of generating form data of the search form based on the binary image of the search form obtained in said second binary image obtaining step; and a form identifying step of identifying the identification code of the register form similar to the search form by comparing the form data of the search form with each of the stored plural form data of the register form.

* * * * *

UNITED STATES PATENT AND TRADEMARK OFFICE
CERTIFICATE OF CORRECTION

PATENT NO. : 7,277,584 B2  Page 1 of 1
APPLICATION NO. : 10/190819
DATED : October 2, 2007
INVENTOR(S) : Keiko Nakanishi et al.

It is certified that error appears in the above-identified patent and that said Letters Patent is hereby corrected as shown below:

COLUMN 2

Line 29, "from" should read --form--;
Line 45, "be," should read --is,--; and
Line 60, "serving" should read --serves--.

COLUMN 3

Line 47, "bloc," should read --block,--.

COLUMN 5

Line 2, "bloc," should read --block,--;
Line 14, "with" should be deleted; and
Line 46, "bloc," should read --block,--.

COLUMN 6

Line 7, "with" should be deleted.

COLUMN 7

Line 45, "items" should read --items of--.

Signed and Sealed this

Sixteenth Day of September, 2008

JON W. DUDAS
*Director of the United States Patent and Trademark Office*